Feb. 8, 1944. E. M. SPLAINE 2,341,338
OPHTHALMIC MOUNTING
Original Filed June 29, 1938
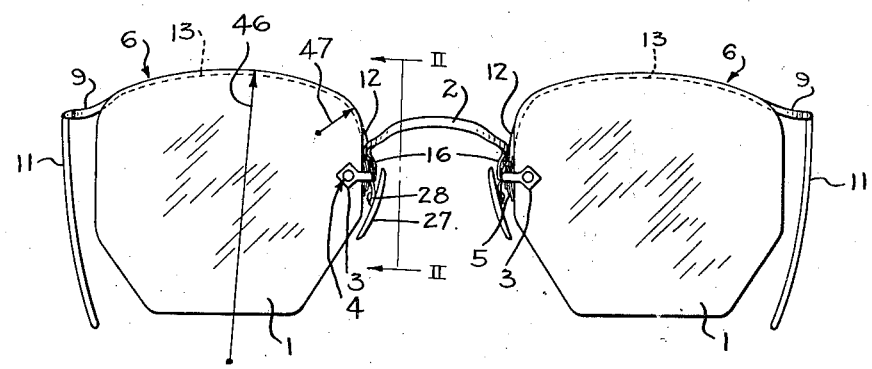
Fig. I
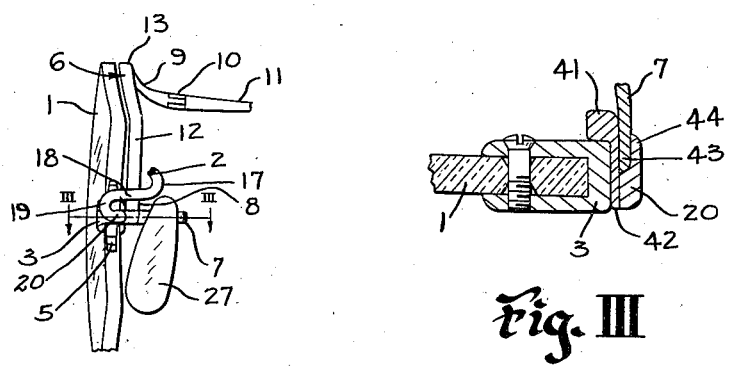
Fig. II
Fig. III
Fig. IV
INVENTOR
EDWARD M. SPLAINE
BY
Louis L. Gagnon
ATTORNEY Patented Feb. 8, 1944

2,341,338

UNITED STATES PATENT OFFICE 2,341,338

OPHTHALMIC MOUNTING

Edward M. Splaine, Southbridge, Mass., assignor to American Optical Company, Southbridge, Mass., a voluntary association of Massachusetts Original application June 29, 1938, Serial No. 216,532. Divided and this application September 15, 1941, Serial No. 410,862

4 Claims. (Cl. 88—41)

This invention relates to improvements in ophthalmic mountings and has particular reference to improved means of making the same.

This application is a division of my copending application, Serial No. 216,532, filed June 29, 1938 now issued as Patent No. 2,255,831.

One of the principal objects of the invention is to provide a novel rimless type ophthalmic mounting having temple supporting means connected adjacent the attachments of the bridge member to the lenses and which are shaped to extend substantially throughout the upper contour edges of the lenses and to which the temples are pivotally attached adjacent the upper temporal edges of the lenses and has particular reference to making the same whereby the said temple supports will have a relatively rigid and durable connection at their points of attachment to said mounting.

Another object of the invention is to provide novel means of assembling and securing the supporting parts of the mounting together.

Another object is to provide a construction and assembly of parts of an ophthalmic mounting having the above characteristics whereby the said parts may be joined by a single soldering operation.

Another object is to provide a construction and assembling and joining of the parts of ophthalmic mountings having the above characteristics together whereby the said temple supporting means may be simultaneously connected with the lens straps and nose bearing pad supporting means of such mountings.

Another object is to provide a construction and assembling and joining of the parts of ophthalmic mountings having the above characteristics together whereby the said temple supporting means may be attached to the lens straps, nose bearing pad supporting means and ends of the bridge member to provide a relatively rigid, durable and compact attachment where the parts may be all joined together simultaneously or separately connected with each other.

Another object of the invention is to provide improved means of joining together the parts of an ophthalmic mounting having the above characteristics whereby the bridge sizes standardized in the art may be used in forming such mountings.

Another object is to provide an ophthalmic mounting of the above character with lens means resiliently supported to relieve shock and strain thereon during use.

Other objects and advantages of the invention should become apparent from the following description taken in connection with the accompanying drawing and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred form only has been given by way of illustration.

Referring to the drawing:

Fig. I is a front elevation of an ophthalmic mounting embodying the invention.

Fig. II is a sectional view taken as on line II—II of Fig. I and looking in the direction indicated by the arrows.

Fig. III is a cross sectional view taken along line III—III of Fig. II showing the arrangement of parts.

Fig. IV is a fragmentary plan view of the temporal end of the temple support.

This invention resides in the provision of an ophthalmic mounting having rimless type lenses and lens supporting means so formed that the major portion of said supporting means is positioned above the useful field of side vision with the said supporting means free from direct connection with the lenses.

Ophthalmic mountings of the above nature are not basically new in the art as many different attempts have been made to form such mountings, particularly mountings having semi-rim sections fitting about the upper contour edges of the lenses and to which the temples are connected. Difficulty, however, was encountered in the construction of some of such mountings, particularly those of the type disclosed herein, in providing a positive, rigid and durable connection of the temple supporting means with the associated parts of the mounting so that the said temple supports will maintain a desired relation with the lenses during use. Difficulty was also encountered in the process of manufacture, that is, in providing a construction which could be quickly and easily assembled and be rigidly and positively secured together. Another difficulty with some of such prior art mountings was in maintaining the bridge sizes to the standards set up in the art and which control the fit of the mounting with the nose and position the optical centers of the lenses in proper relation with the centers of the pupils of the eyes of the wearer.

It, therefore, is one of the primary objects of the invention to provide a construction of ophthalmic mounting having temple supporting means which are shaped substantially to the upper contour shape of the lenses and which have no positive connection with the lenses whereby the said parts of the mounting may be quickly, easily and positively assembled and secured in desired relation with each other so as to durably maintain the temple supporting means in desired relation with the lenses and yet relieve shock and strain on the lenses during the use of the mounting.

Referring more particularly to the drawing wherein like characters of reference designate like parts throughout the several views, the device embodying the invention comprises broadly a pair of lenses 1 connected to a bridge member 2 by suitable lens straps 3. The lens straps 3 have a pivotal connection 4 with the lens and are provided with resilient means 5 for limiting the pivotal movement of the lens about said pivotal connection and for relieving shock and strain on the lenses during use of the mounting. Relatively long and slender temple supports 6, shaped to substantially the same contour shape as the upper contour edges of the lenses and to lie in the rear of the plane of said lenses, are secured, as illustrated, to the rear of the lens straps 3 and to the sides of the nose pad supporting means or arms 7, as illustrated at 8. The relatively long and slender temple supports 6 may be attached to the lens straps 3 and nose pad supporting arms 7 by soft or hard soldering, or by welding and are provided adjacent their opposite ends with outwardly and rearwardly deflected portions 9 having a pivotal connection 10 with the temples 11.

The long and slender temple supports 6 may be formed of rigid, pliable, ductile or resilient material or may have portions thereof possessing one or more of said characteristics. For example, the portion 12 of said supports 6 adjacent the nasal edges of the lenses might be formed relatively rigid; the intermediate portion 13 shaped substantially to the upper contour shape of the lenses might be formed resilient and the outwardly and rearwardly deflected end 9 formed ductile or pliable. This arrangement would provide sufficient strength and rigidity adjacent the end of the arm connected to the lens straps 3 and nose pad supporting arms 7, as illustrated, and yet permit the intermediate portion 13 to flex slightly to remove strain at said connection 8 when the mounting is being positioned on or removed from the face with the said ductile or pliable portion being sufficiently adjustable to decrease or increase the distance between the temples to meet the requirements as to the widths of the faces of different individuals.

In Fig. III, there is illustrated an assembly construction wherein the ends 41 of the temple supports 6 are provided with a reduced angled portion 42, shaped to lie between the end 20 of the bridge and the portion of the strap 3 which overlies the edge of the lens. In this instance the portion 42 is sandwiched between the portion 20 and the edge portion of the lens strap 3 and the nose pad supporting arm 7 is provided with a portion 43 sandwiched between an overlying portion 44 of the end 20 and the deflected portion 42 of the lower end 41 of the temple support 6. This arrangement is to provide ease in assembling and holding the parts in desired fitted relation with each other prior to the soldering operation. It is to be understood that the various assembled parts may be connected by soft soldering, hard soldering or by welding as desired.

In the remaining structure, such as shown in Fig. III, the lens straps have a rigid connection with the lenses, that is, there is no space between the edge of the lens and the portion of the lens strap overlying said edge. It is to be understood, however, that the lens straps illustrated in Fig. III may be provided with resilient means as desired and may be fitted to the lenses so that the edge portions thereof are in spaced relation with the lenses. It is also to be understood that any suitable type of connecting means known in the art may be used with all of said structures.

In practice, the temple supporting portions 6 are preferably adjusted to follow the upper edge contour shape of the lenses in a plane in the rear of said edges. The temple supports each have a portion 12 shaped substantially to the inner edge portion of a respective lens and which extends downwardly substantially to the center line of the lens and each have an outwardly, downwardly and rearwardly extending portion 9 adjacent the upper temporal edge of the lens. It will be noted that the said temple supports 6 have a central portion 13 arching upwardly about a relatively long radius 46 and blending into an arc of a shorter radius 47 connecting the depending portions 12 with the portions 13 with the said portions lying in a plane substantially parallel with the plane of the rear surfaces of the lenses and blending into an arc, of a shorter radius 48 than either of the first mentioned radii, connecting the rearwardly extending portion 9 with the intermediate portion 13.

The rearwardly extending portions 9 have upper and lower surfaces and side surfaces which blend with and are substantially flush with the adjacent connected end of the temple when the temple is in extended position of use. The temple engaging ends of the arms 9 or portions thereof having pivotal connections with said temples have a cross sectional dimension which is greater than that of the portions of said arms 9 which blend into the intermediate portions 13 of the temple supports 6. There is a continuously decreasing inward taper from the pivotal connection 10 to the intermediate portion 13 substantially throughout the length of the portion 9 so that the parts have a pleasing blended relation with each other.

Although applicant has shown and described the temple supports 6 as being shaped to lie in a plane in the rear of the plane of the lenses the said supports may be shaped substantially to the upper contour shape of the lenses and to lie substantially in the plane of the lenses.

From the foregoing description it will be seen that simple, efficient and economical means have been provided for accomplishing all of the objects and advantages of the invention, particularly that of providing the temple supports, lens straps, nose pad supporting arms and bridge member with a relatively positive and durable connection whereby the said parts will be held in desired assembled relation with each other during use and which will enable the said parts to be quickly and easily assembled and secured in said relation.

Having described my invention, I claim:

1. A lens supporting structure for the lenses of an ophthalmic mounting, said lens supporting structure comprising lens holding means having a portion shaped to overlie a side surface of the lens and a portion shaped to overlie an edge of the lens, relatively long and slender temple supports having a portion shaped to follow substantially the upper contour shape of the lens when associated therewith and having a temple connection adjacent the outer temporal end thereof and a portion shaped to overlie and secured to the edge portion of the lens holding means, a bridge member having side portions each shaped to overlie the adjacent end of the relatively long and slender temple support with a portion thereof secured to said support and with a portion thereof spaced from said support and a nose pad supporting arm having a portion secured in said space between the adjacent end of said long and slender temple support and the spaced portion of the adjacent end of the bridge member with the end of said arm concealed from the front by the joined portions of the side of the bridge and said temple support.

2. An ophthalmic mounting comprising a pair of lenses and a lens supporting structure, said lens supporting structure comprising lens holding means having a portion shaped to overlie a side surface of the lens and a portion shaped to overlie an edge of the lens, relatively long and slender temple supports having a portion shaped to follow substantially the upper contour shape of the lens and having a temple connection adjacent the outer temporal end thereof and a portion shaped to overlie and secured to the edge portion of the lens holding means, a bridge member having side portions each shaped to overlie the adjacent end of the relatively long and slender temple support with a portion thereof secured to said support and with a portion thereof spaced from said support and a nose pad supporting arm having a portion secured in said space between the adjacent end of said long and slender temple support and the spaced portion of the adjacent end of the bridge member with the end of said arm concealed from the bront by the joined portions of the side of the bridge and the temple support.

3. A lens supporting structure for the lenses of an ophthalmic mounting, said lens supporting structure comprising lens holding means having a portion shaped to overlie a side surface of the lens and a portion shaped to overlie an edge of the lens, relatively long and slender temple supports each having a portion shaped to follow substantially the upper contour shape of a respective lens of the ophthalmic mounting when associated therewith and having a temple connection adjacent the outer temporal end thereof and a forwardly deflected portion adjacent the nasal end thereof shaped to overlie and secured to the edge portion of the lens holding means, a bridge member having side portions each shaped to overlie the forwardly deflected end of the respective relatively long and slender temple support with a portion thereof secured to said support and with a portion thereof spaced from said support and nose pad supporting arms each having a portion secured in said space between the adjacent end of the long and slender temple support and the spaced portion of the adjacent end of the bridge member with the end of said arm concealed from the front by the joined portions of the side of the bridge and the temple support.

4. An ophthalmic mounting comprising a pair of lenses and a lens supporting structure for said lenses, said lens supporting structure comprising lens holding means having a portion shaped to overlie a side surface of the lens and a portion shaped to overlie an edge of the lens, relatively long and slender temple supports each having a portion shaped to follow substantially the upper contour shape of the lens and having a temple connection adjacent the outer temporal end thereof, and a forwardly deflected portion adjacent the nasal end thereof shaped to overlie and secured to the edge portion of the lens holding means, a bridge member having side portions each shaped to overlie the forwardly deflected end of the respective relatively long and slender temple support with a portion thereof secured to said support and with a portion thereof spaced from said support and nose pad supporting arms each having a portion secured in said space between the adjacent end of the long and slender temple support and the spaced portion of the adjacent end of the bridge member with the end of said arm concealed from the front by the joined portions of the side of the bridge and the temple support.

EDWARD M. SPLAINE.